(12) United States Patent
Steinhauser et al.

(10) Patent No.: US 10,737,369 B2
(45) Date of Patent: Aug. 11, 2020

(54) NUT DEVICES FOR INSTRUMENT STAND

(71) Applicant: DRUM WORKSHOP, INC., Oxnard, CA (US)

(72) Inventors: Ruben Steinhauser, Altusried (DE); Richard A. Sikra, Thousand Oaks, CA (US)

(73) Assignee: Drum Workshop, Inc., Oxnard, CA (US)

( * ) Notice: Subject to any disclaimer, the term of this patent is extended or adjusted under 35 U.S.C. 154(b) by 172 days.

(21) Appl. No.: 15/873,715

(22) Filed: Jan. 17, 2018

(65) Prior Publication Data

US 2018/0200869 A1 Jul. 19, 2018

Related U.S. Application Data

(60) Provisional application No. 62/516,627, filed on Jun. 7, 2017, provisional application No. 62/447,414, filed on Jan. 17, 2017.

(51) Int. Cl.
| | |
|---|---|
| *F16B 37/08* | (2006.01) |
| *B25B 13/06* | (2006.01) |
| *G10D 13/00* | (2020.01) |
| *G10G 7/00* | (2006.01) |
| *G10D 13/06* | (2020.01) |

(52) U.S. Cl.
CPC .......... *B25B 13/06* (2013.01); *F16B 37/0857* (2013.01); *G10D 13/00* (2013.01); *G10G 7/00* (2013.01); *F16B 37/0821* (2013.01); *F16B 37/0885* (2013.01); *G10D 13/06* (2013.01)

(58) Field of Classification Search
CPC .. F16B 37/0857; F16B 37/08; F16B 37/0821; F16B 37/0885

USPC .......................................... 411/433, 437, 435
See application file for complete search history.

(56) References Cited

U.S. PATENT DOCUMENTS

| | | | | |
|---|---|---|---|---|
| 971,375 | A | * 9/1910 | Hays | B25B 27/26 29/217 |
| 2,118,361 | A | * 5/1938 | Schaeffer, Jr. | F16B 37/0821 411/433 |
| 3,817,111 | A | * 6/1974 | Allen | G01B 5/008 74/156 |
| 3,893,363 | A | 7/1975 | Cohen | |
| 4,336,717 | A | * 6/1982 | Goebel | F16B 37/0821 73/487 |
| 4,369,012 | A | * 1/1983 | Bailet | A47B 57/265 411/265 |
| 4,960,028 | A | * 10/1990 | Ramirez | G10D 13/06 84/421 |
| 6,953,314 | B2 | * 10/2005 | Magagna | E03C 1/0401 411/301 |
| 7,034,216 | B2 | 4/2006 | DiPietro | |

(Continued)

OTHER PUBLICATIONS

PCT International Search Report for Application No. PCT/US2018/014088, dated May 15, 2018.

*Primary Examiner* — Flemming Saether
(74) *Attorney, Agent, or Firm* — Ferguson Case Orr Paterson

(57) ABSTRACT

Nut devices including a butterfly portion with an axial hole that can be opened such that the nut device can be slid up or down a host device, such as a cymbal stand rod, without the typical screw-type motion, are disclosed. Also disclosed are nut devices including drum key functionality.

19 Claims, 6 Drawing Sheets

(56) References Cited

U.S. PATENT DOCUMENTS

| | | | |
|---|---|---|---|
| 7,479,593 B1 * | 1/2009 | Townsend | G10D 13/06 248/635 |
| 7,629,526 B1 | 12/2009 | Miyajima | |
| 8,763,214 B2 * | 7/2014 | Yang | B25B 5/06 24/500 |
| 9,903,408 B2 * | 2/2018 | Liao | F16B 37/0821 |
| 10,465,737 B2 * | 11/2019 | Huang | F16B 37/041 |
| 2005/0056137 A1 | 3/2005 | Dipietro | |
| 2012/0167357 A1 | 7/2012 | Yang | |
| 2013/0174712 A1 | 7/2013 | Lin | |
| 2013/0256482 A1 | 10/2013 | Liao | |

* cited by examiner

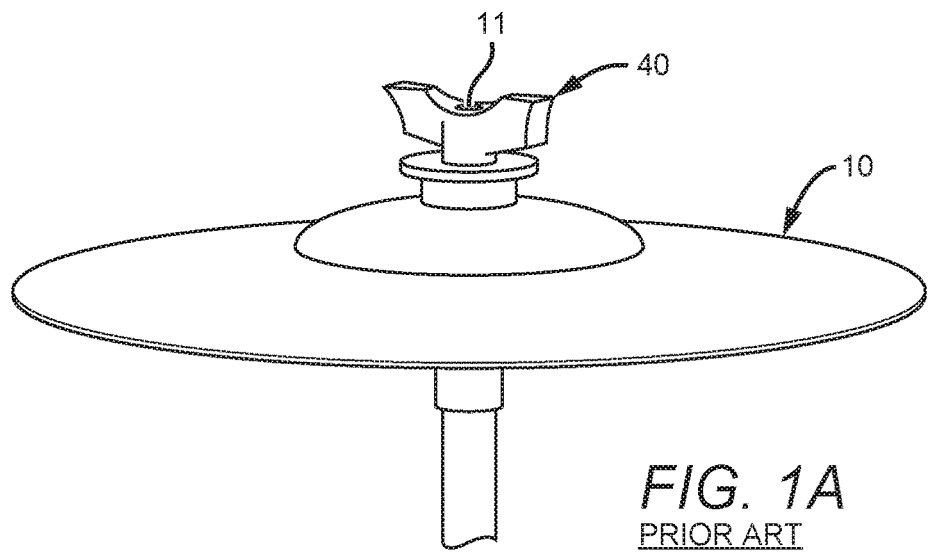
FIG. 1A
PRIOR ART
FIG. 1B
PRIOR ART
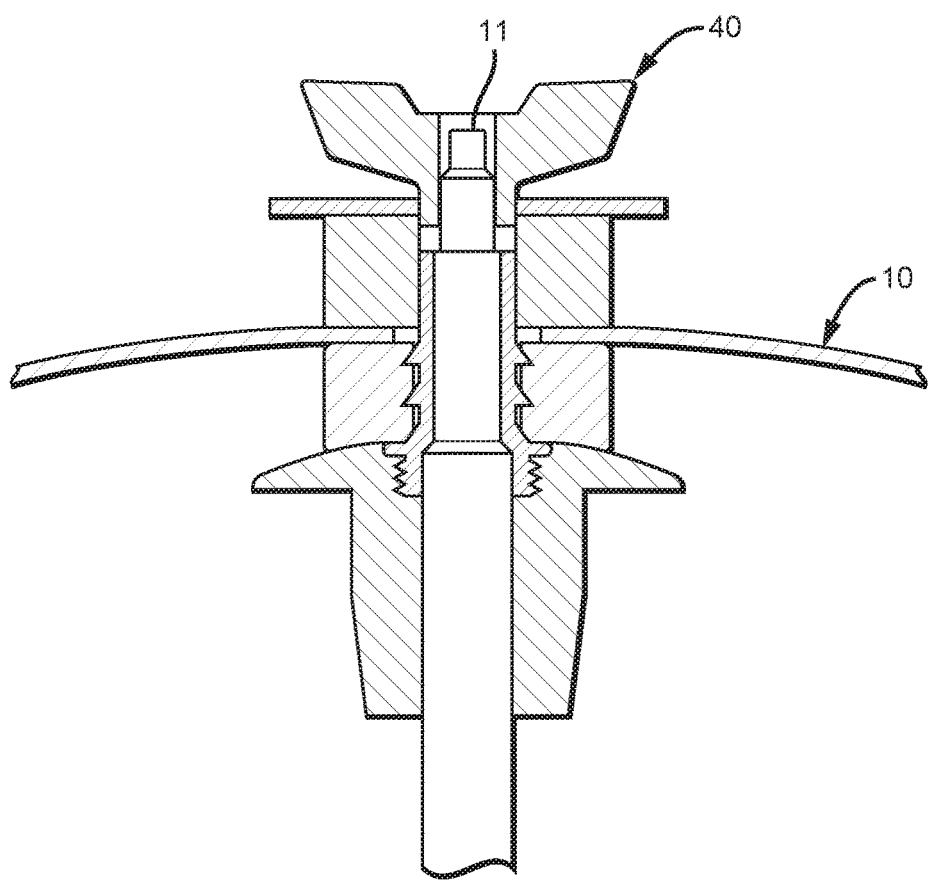

FIG. 5D
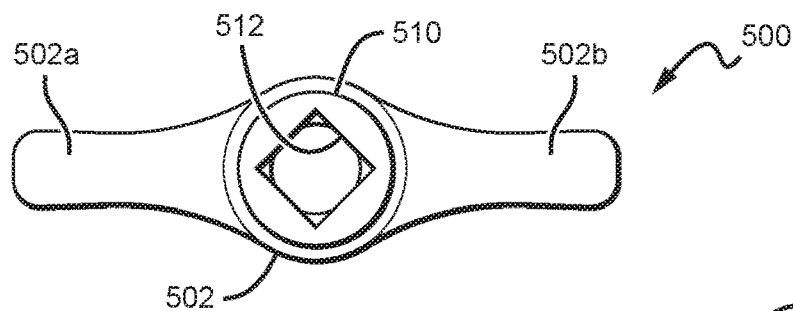
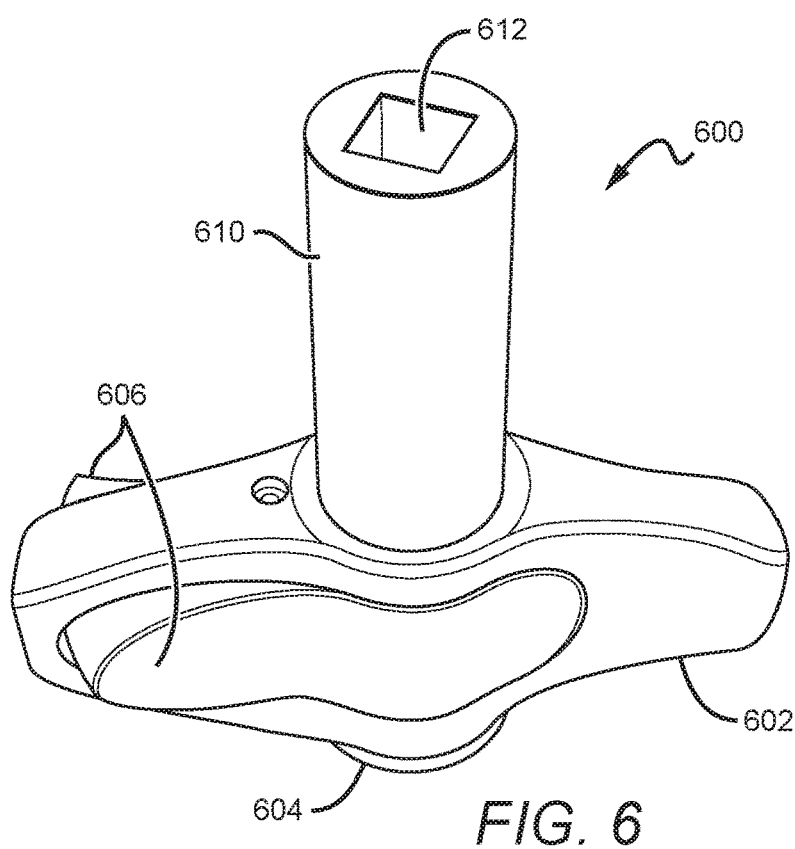
FIG. 6
FIG. 7
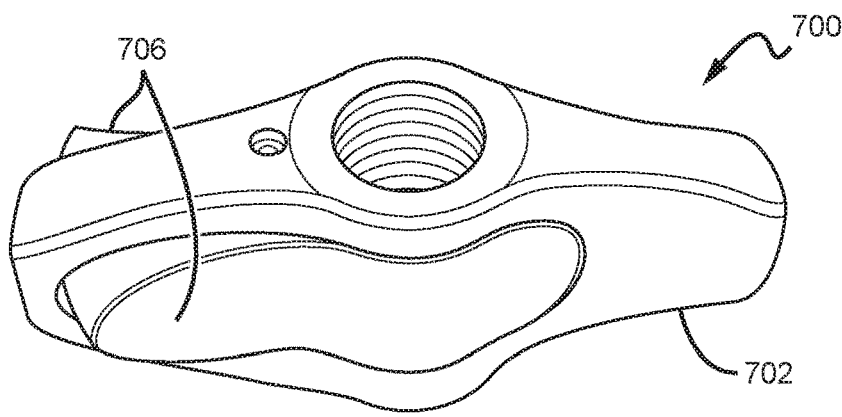

NUT DEVICES FOR INSTRUMENT STAND

This application claims the benefit of U.S. Provisional Pat. App. No. 62/447,414 to Steinhauser, filed on Jan. 17, 2017 and entitled "Nut Device for Instrument Stand," and to U.S. Provisional Pat. App. No. 62/516,627 to Steinhauser et al., filed on Jun. 7, 2017 and entitled "Nut Devices for Instrument Stand," each of which is fully incorporated by reference herein in its entirety.

BACKGROUND OF THE DISCLOSURE

Field of the Disclosure

Aspects of the present disclosure generally relate to instruments such as percussion instruments, and more specifically, to components such as nuts (e.g., wingnuts), screws, and drum keys for use with percussion instruments.

Description of Related Art

FIGS. 1A and 1B show perspective and cross-sectional views of part of a prior art cymbal assembly. Cymbal assemblies such as that shown in FIGS. 1A and 1B often include a wingnut 40 over a top cymbal 10 to secure the top cymbal 10 and other components attached to a cymbal stand rod 11 in place. Removal of a wingnut such as the wingnut 40 can take more time than desired due to the required screw-type action to move the wingnut 40 up or down along the cymbal stand rod 11.

Additionally, a tool often used by percussionists to tighten and loosen screws on their instruments is a drum key. Drum keys are known in the art, and some exemplary prior art drum keys are described in U.S. Pat. No. 5,193,418 to Behrenfeld, which is fully incorporated by reference herein in its entirety. Drum keys are used for turning screws or similar devices to adjust various parts of different percussion instruments. Drum keys are often attached via a static clip mechanism to, for instance, a drum pedal footboard, and can often come loose and become lost.

SUMMARY OF THE DISCLOSURE

One embodiment of a nut device for use with a percussion stand according to the present disclosure includes a frame with a butterfly piece attached to that frame. The butterfly piece includes first and second portions, and a spring biases the butterfly piece to a closed position such that the first and second butterfly portions combine to form a butterfly axial hole.

Another embodiment of a nut device for use with a percussion stand according to the present disclosure includes a main body with wings, the main body shaped to define a threaded axial hole for attachment to a percussion stand. The nut device also includes a drum key portion extending from the main body that is shaped to define a noncircular axial hole for engaging a drum screw.

One embodiment of a nut device for attachment to a percussion stand rod according to the present disclosure includes an axle, with a first butterfly portion connected to the axle and including a first inner threaded portion, the first butterfly portion also including first and second sides on opposite sides of said axle; and a second butterfly portion connected to the axle and including a second inner threaded portion, the second butterfly portion also including first and second sides on opposite sides of the axle. The nut device also includes a spring between the second sides of the first and second butterfly portions. The spring biases the first and second butterfly portions such that the first sides are proximate one another or in mutual contact when in a resting position, and such that the first inner threaded portion and said second inner threaded portion form an axial hole when in that resting position. Squeezing together the second sides of the first and second butterfly portions opens or widens a gap in the axial hole.

The above summary has outlined, rather broadly, some features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same or similar purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

FIGS. 1A and 1B show perspective and cross-sectional views of part of a prior art cymbal assembly;

FIGS. 5A-5D show perspective, front, bottom, and top views of a nut device according to another embodiment of the present disclosure;

FIG. 6 shows a perspective view of a nut device according to yet another embodiment of the present disclosure; and FIG. 7 shows a perspective view of a nut device according to yet another embodiment of the present disclosure.

DETAILED DESCRIPTION OF THE DISCLOSURE

A device that serves the purpose of a wingnut in a percussion assembly, such as a cymbal assembly, while also being easy to remove and/or mount, is desired. Also desired is a drum key that is efficiently and securely attached to a drum assembly or accompanying device. The present disclosure describes nut devices including a butterfly portion with an axial hole that can be opened such that the nut device can be slid up or down a host device, such as a cymbal stand rod, without the typical screw-type motion. The present disclosure also describes nut devices including drum key functionality.

It is understood that when an element is referred to as being "on" another element, it can be directly on the other element or intervening elements may also be present. Further, when one element is referred to as being "connected" to another element, it can be directly connected to the other element or intervening elements may also be present as would be understood by one of skill in the art. Furthermore, relative terms such as "inner", "outer", "upper", "top", "above", "lower", "bottom", "beneath", "below", and similar terms, may be used herein to describe a relationship of one element to another. Terms such as "higher", "lower", "wider", "narrower", and similar terms, may be used herein to describe angular and/or relative relationships. It is understood that these terms are intended to encompass different orientations of the elements or system in addition to the orientation depicted in the figures.

Although the terms first, second, etc., may be used herein to describe various elements, components, regions and/or sections, these elements, components, regions, and/or sections should not be limited by these terms. These terms are only used to distinguish one element, component, region, or section from another. Thus, unless expressly stated otherwise, a first element, component, region, or section discussed below could be termed a second element, component, region, or section without departing from the teachings of the present disclosure.

Embodiments of the disclosure are described herein with reference to view illustrations that are schematic illustrations. As such, the actual thickness of elements can be different, and variations from the shapes of the illustrations as a result, for example, of manufacturing techniques and/or tolerances are expected. Thus, the elements illustrated in the figures are schematic in nature and their shapes are not intended to illustrate the precise shape of a region and are not intended to limit the scope of the disclosure.

Figure 2A:
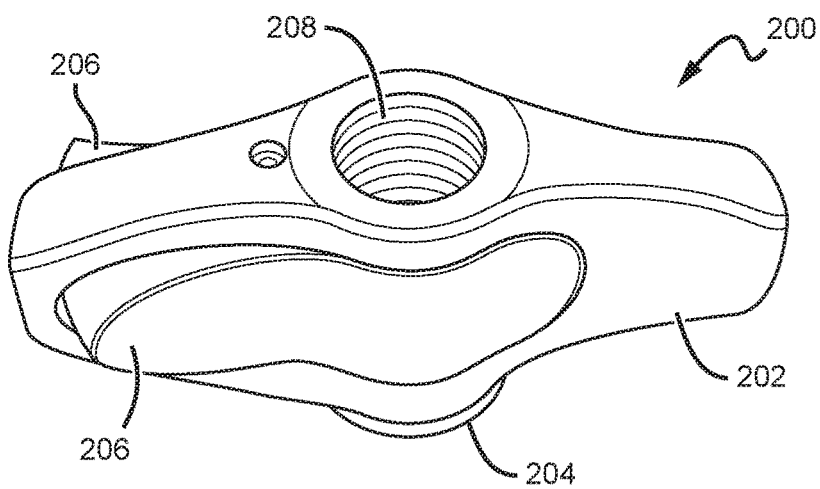
FIGS. 2A-2E show perspective, front, bottom, top, and left side views of a nut device according to one embodiment of the present disclosure.
Figure 2B:
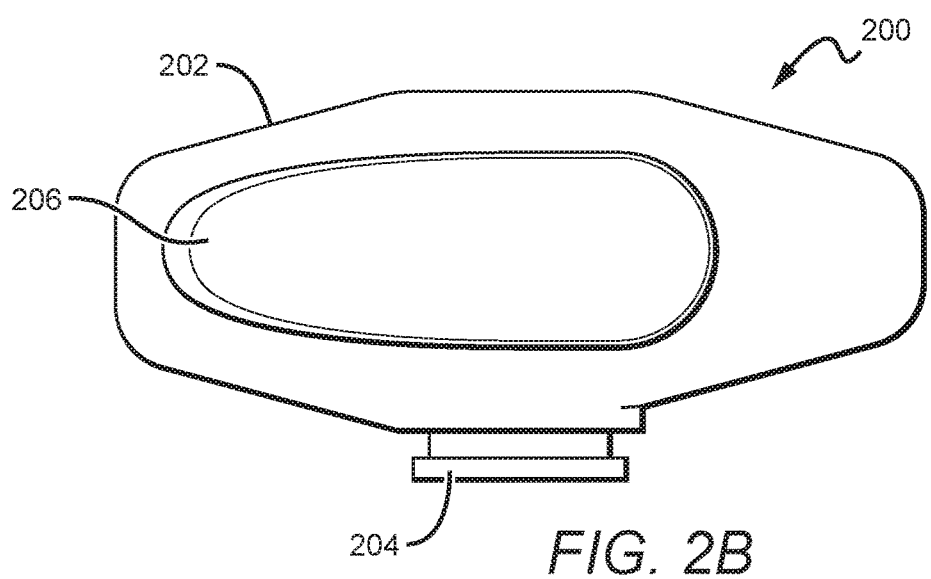
Figure 2C:
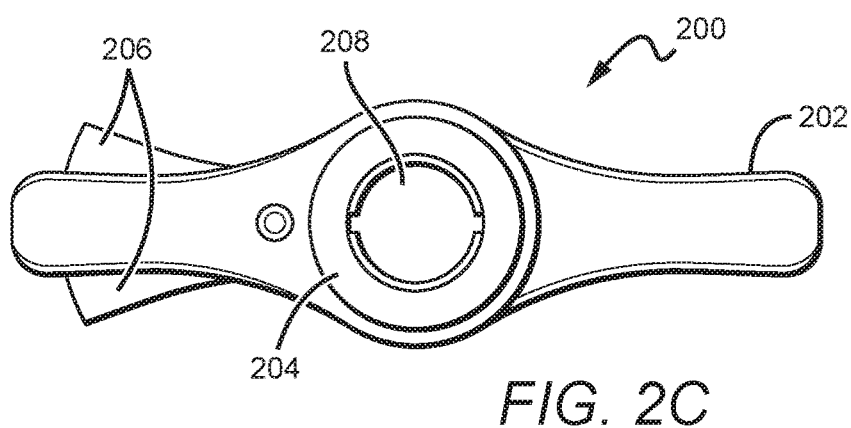
Figure 2D:
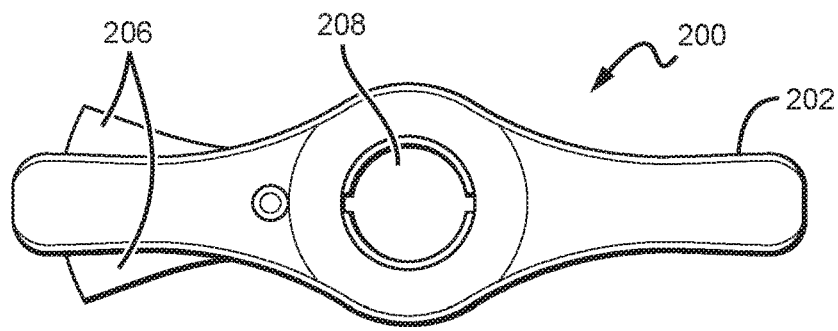
Figure 2E:
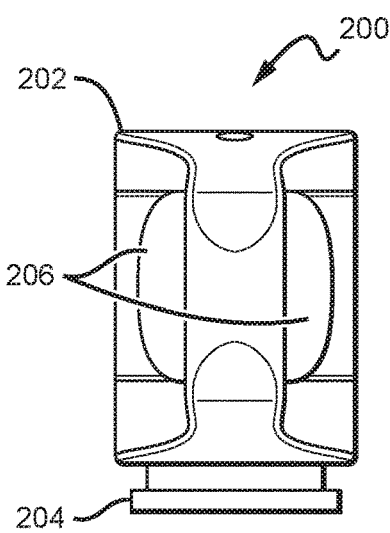
Figure 3:
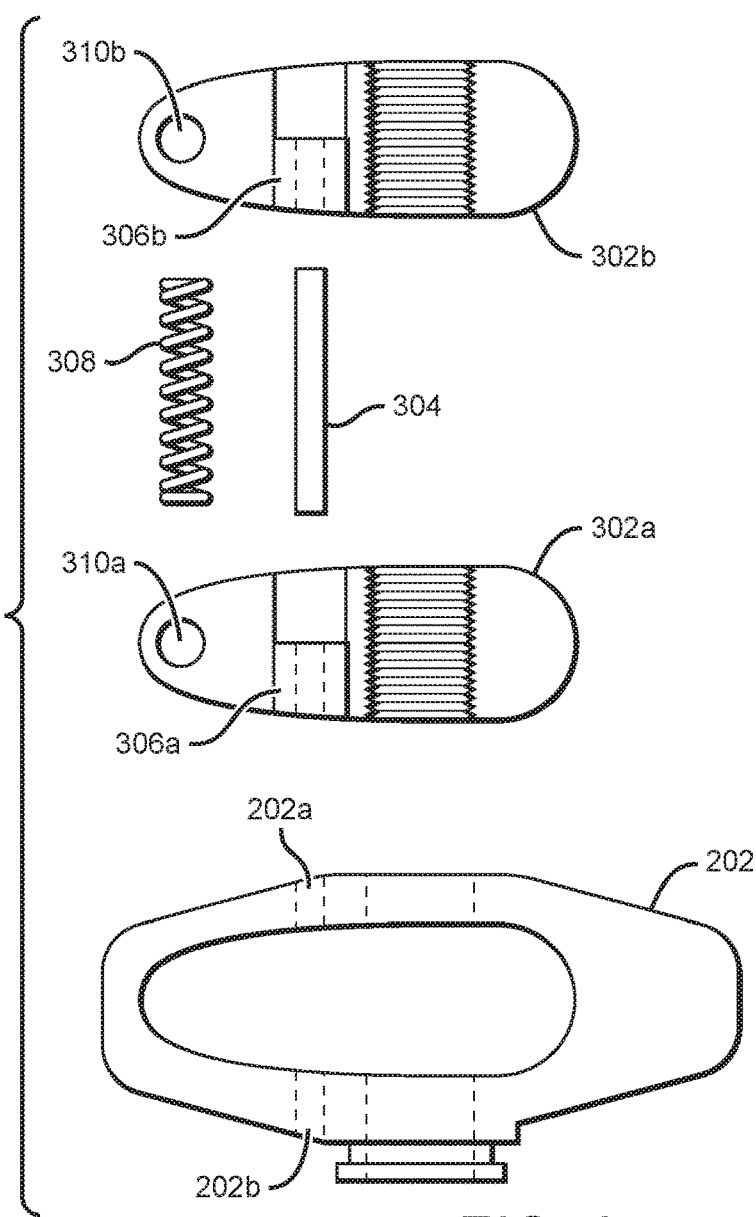
FIG. 3 shows an exploded view of the nut device shown in FIGS. 2A-2E.

FIGS. 2A-2E show a nut device 200 for use in place of a traditional wingnut in a percussion assembly such as a cymbal assembly, with FIG. 3 showing an exploded view of the nut device 200 for a better understanding of the device's components. The nut device 200 can include a main body or frame 202 (referred to herein simply as a "frame") and an attachment portion 204 which can be placed onto a host device, such as a cymbal stand rod or similar device, attached thereto. The attachment portion 204 can be integral with the frame 202 as shown, though other embodiments are possible. Embodiments not including an attachment portion 204 are possible. The nut device 200 can define an axial hole 208 which can be threaded, as shown, for example, in the perspective view of FIG. 2A. The axial hole 208 and other axial holes described herein can include different portions, such as a frame axial hole, attachment portion axial hole, and butterfly portion axial hole corresponding to the frame 202, attachment portion 204, and butterfly piece 206, respectively. Additionally, as shown, the axial hole 208 can be open on both its bottom and top such that a host device (such as a cymbal stand rod) can extend completely therethrough and protrude from the top, though other embodiments are possible.

The nut device 200 can also include a butterfly piece 206, which can be internal to the frame 202 as shown. The inside of the butterfly piece 206 can include the threading within the axial hole 208, while the insides of the axial hole corresponding to other portions of the nut device 200 (such as the frame 202 and the attachment portion 204) may not be threaded and/or may be smooth so as to allow for the device to be moved upward or downward on a host device (e.g., cymbal stand rod) without a screwing motion when the butterfly piece 206 is in an open position, which will be described more fully below.

The butterfly piece 206 can operate similarly to or in the same manner as a spring-loaded clip device. In the specific embodiment shown, the butterfly piece includes two butterfly portions 302a,302b. The butterfly portions 302a,302b can be joined by an axle or similar device 304, which can go through axial holding portions 306a,306b of the butterfly portions 302a,302b. The axial holding portions 306a,306b can be on the inside of the butterfly portions 302a,302b. The axle 304 can also join the butterfly piece 206 to the frame 202, such as via mating or other attachment means of the axle 304, and such as with portions 202a,202b of the frame 202, which can be holes or apertures within the frame.

Additionally, a spring 308 can be held between the butterfly portions 302a,302b to bias the butterfly piece 206 (and portions 302a,302b) to a closed position. The spring 308, which can be a compression spring, can be used to bias the butterfly piece 206 to a closed position so as to form or hold in place the axial hole 208. The spring 308 can be held between portions such as cutout portions 310a,310b of the butterfly portions 302a,302b, although other embodiments are possible. The spring 308 can be attached to the butterfly portions 302a,302b using any number of methods, including but not limited to adhesives and/or other mechanical attachments.

Figure 4A:
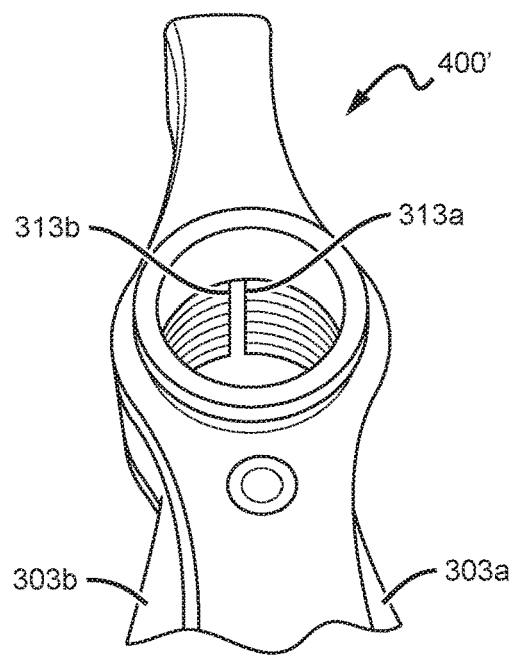
FIGS. 4A-4C show perspective views of the nut device shown in FIGS. 2A-2E.

When biased to the closed position and/or in a resting position such as that shown in FIG. 4A, ends 313a,313b of the inside portions 312a,312b of the butterfly portions 302a,302b can contact one another, be proximate one another, and/or otherwise form a threaded axial hole, which can prevent or make more difficult translational (as opposed to screw-type) movement of the nut device 200 along the host device. A device where the ends 313a,313b are in mutual contact has the benefit of allowing the spring 308 to be over-biased, so that exact biasing of the spring 308 is not necessary. However, it is understood that the axial hole in a closed position need not necessarily include butterfly portions or ends that are in contact with one another.

Actuation sides 303a,303b of the butterfly portions 302a,302b, respectively, are on one side of the axle 304. In the embodiment shown the actuation sides 303a,303b are on the same side of the axle 304 as the spring 308 and/or cutout portions 310a,310b. When the actuation sides 303a,303b are squeezed together or the distance between those sides is otherwise lessened, the butterfly piece 206 can be moved to an open position such as that shown in FIG. 4B, such that the inside portion ends 313a,313b, on the opposite side of the axle 304, do not contact one another and/or are no longer proximate one another, such that the threads of the axial hole 208 are no longer engaged with the host device (e.g., threads of a percussion or cymbal stand rod). An open position can be when the shortest distance of the gap in the axial hole (as measured along the shortest straight-line distance between the inside portion ends 313a,313b) is non-zero, ⅟₁₂₈" or more, ¹⁄₆₄" or more, ¹⁄₃₂" or more, ¹⁄₁₆" or more, ⅛" or more, ¼" or more, and/or ½" or more, and/or even greater; and/or can be when the gap in the axial hole is non-zero, is 1° or more, is 3° or more, is 5° or more, is 7.5° or more, is 10° or more, is 15° or more, is 30° or more, is 45° or more, is 60° or more, is 90° or more, is 135° or more, is 180° or more, and/or is even greater. Many different embodiments are possible, and it is understood that the above ranges are only exemplary. The measurements of when an open position is reached in any specific embodiment can in certain instances be determined, for example, by the characteristics of the host device (e.g., radius of stand rod), axial hole 208 (e.g., radius thereof) and/or threads of the host device and/or axial hole 208 (e.g., height of the threads of either or both).

Figure 4B:
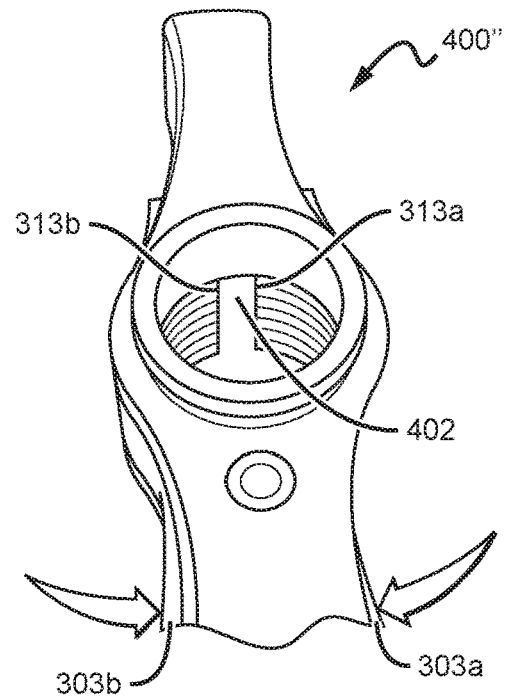
Figure 4C:
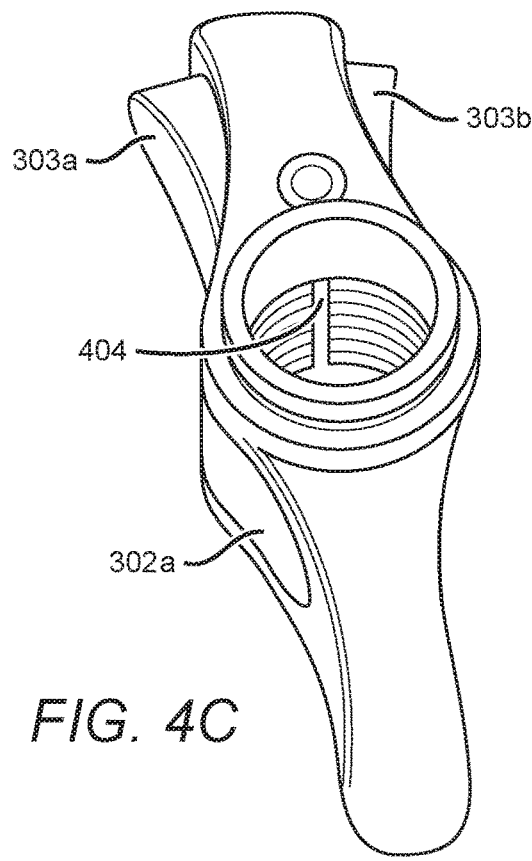
Figure 5A:
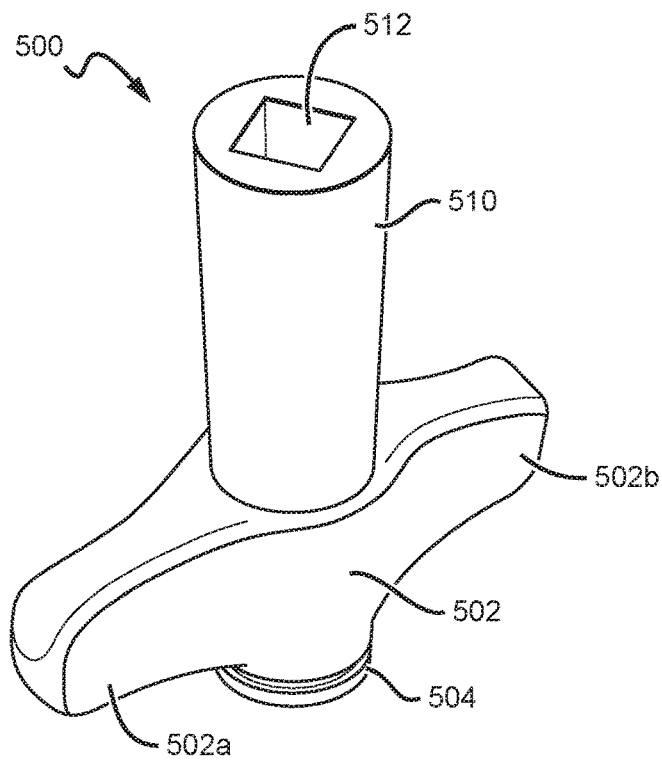
Figure 5B:
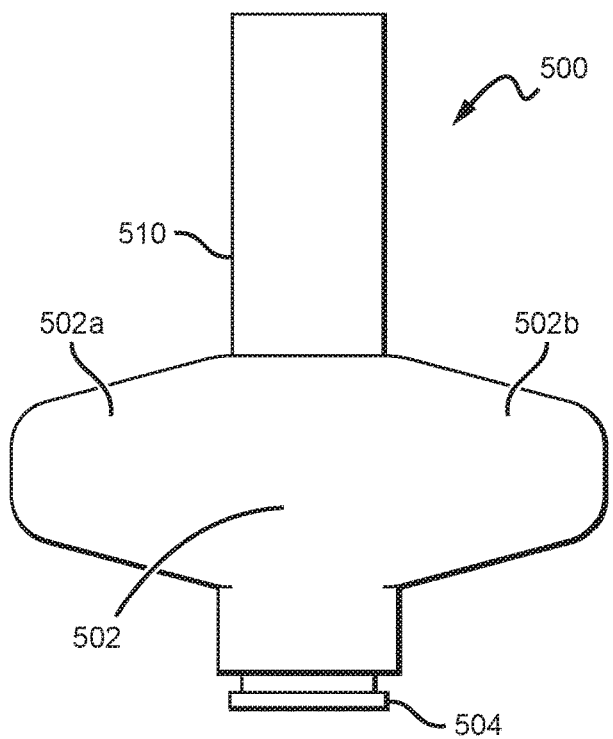
Figure 5C:
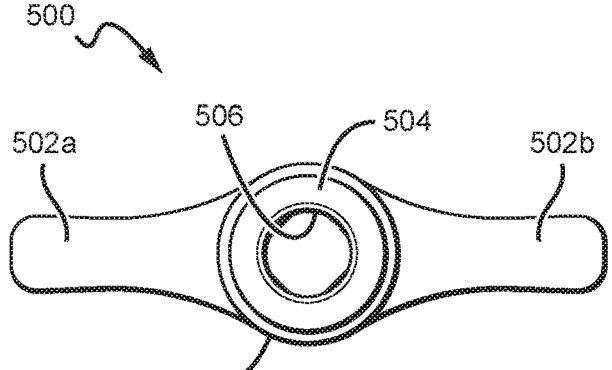

FIGS. 4A and 4B show perspective views of the nut device 200 in a closed/resting position 400' and an open position 400". In the closed position 400', the inside portion ends 313*a*,313*b* of the butterfly portions 302*a*,302*b* contact one another, are proximate one another (as shown), and/or otherwise form the threaded axial hole 208. In the open position 400", a gap 402 between the inside portion ends 313*a*,313*b* is either formed or enlarged (in the specific case shown, enlarged), so as to allow for translational movement of the nut device along the host object (instead of screw-type movement). As shown in FIG. 4C, the opposing side of the axial hole can also include a gap 404 between the butterfly portions 302*a*,302*b*, or no gap may be included and the portion ends could be in mutual contact, or a combination thereof depending on the position of the nut device.

When the butterfly piece is actuated to an open position such as the open position 400", the nut device 200 can be slid onto or off of the host device much more easily than with the typical screw-type motion, which can be more difficult and time consuming. This is because the non-butterfly portions of the axial hole 208 in certain embodiments are not threaded, are smooth, and/or otherwise are not designed to engage the threads of a host device even when the nut device 200 is in a closed position, and the threads of the axial hole 208 corresponding to the butterfly piece 206 are no longer engaged with threads of the host object. The screw functionality of a closed position such as the closed position 400', on the other hand, can enable fine-tuning of the exact position of the nut device 200 relative to the host object so as to meet the user's needs, such as by using the typical screw-type movement.

While the specific embodiment shown and described above describes a butterfly piece including two movable butterfly portions 302*a*,302*b*, it is understood that any number of movable portions is possible, including three or more movable portions or only a single movable portion. For instance, in one embodiments only one of the butterfly portions 302*a*,302*b* is movable while the other is static. One embodiment includes only a single butterfly portion. Further, while a butterfly portions 302*a*,302*b* allow for one manner of movement to cause the nut device 200 to be in an open position, other types of movement such as axial movement or displacement (including but not limited to substantially horizontal movement normal to and/or outward from the center of the frame 202) of one or more pieces is also possible to achieve an open position.

Embodiments other than those specifically described above are possible. For instance, in one case the nut device can be placed onto the instrument from the side. For example, in some embodiments the frame 202 and/or attachment portion 204 include a static gap corresponding to the gap that opens between the butterfly portions, allowing for attachment from the side. In another embodiment, the frame 202 and/or attachment portion 204 are also configured for butterfly or other movement so as to open a gap corresponding to the gap of the butterfly portion 206 (when in an open position) so as to enable such attachment. In another embodiment the frame 202 and attachment portion 204 are excluded, such that a nut device in an open position can be placed on the instrument stand from the side, then allowed to close around the instrument stand to a closed position. Many different embodiments are possible.

FIGS. 5A-5D show perspective, front, bottom, and top views of a nut device 500 according to another embodiment of the present disclosure. The nut device 500 can be used, for instance, in hi-hat devices such as the hi-hat device shown in FIGS. 1A and 1B, and/or in place of wing screws such as the wingnut 40. The nut device 500 can include some portions similar to or the same as the nut device 200. For instance, the nut device 500 can include a main body 502 and/or an attachment portion 504 that can be the same as or similar to the frame 202 and/or attachment portion 204, respectively. The attachment portion 504 can be excluded in certain embodiments, where part of the main body 502 can serve a similar or the same purpose. Wing portions 502*a*, 502*b* can be included, such as included as part of the main body 502. The wing portions 502*a*,502*b* can assist with the screwing and unscrewing of the nut device 500 (where screwing is necessary, which it may not be in certain embodiments also including elements of the previously described embodiments).

The nut device 500 can include an attachment aperture 506 that can serve the same or similar purpose to the axial hole 208 of the nut device 200. In some embodiments the attachment aperture 506 includes threads, though in other embodiments it may not. The attachment aperture 506 can attach to a host device such as a cymbal rod to aid in keeping other elements of the cymbal device in proper position. It is understood that not all portions of the attachment aperture 506 need necessarily include threads. For example, a portion of the attachment aperture 506 corresponding to the attachment portion 504 may not include threads while other portions may include threads.

The nut device 500 can also include a drum key portion 510 that can itself be shaped to define a drum key aperture or bore 512 (referred to hereafter simply as a "drum key aperture"). The drum key aperture 512 can be shaped so as to be operable on typical drum screws, such as screws with a substantially square cross-sectional shape. Typically a drum key is attached via a static clip mechanism to, for instance, a drum pedal footboard, and can often come loose and become lost. The nut device 500, however, is much less likely to become lost due to its attached position on, for instance, a cymbal stand, and also because of its screw mechanism of attachment which can prevent accidental dislodgment. Inclusion of a drum key aperture 512 as part of the nut device 500 can thus aid in preventing the loss of the drum key, and/or can provide a backup drum key to a user. The drum key portion 510 can be excluded in certain embodiments, where part of the main body 502 can serve a similar or the same purpose (such as including a drum key aperture similar to or the same as 512 through a portion of the main body 502).

While the attachment aperture 506 and the drum key aperture 512 are shown in the nut device 500 as being continuous with one another and/or such that the axial hole goes through the entire device (changing cross-section therein), it is understood that they may be separated from one another in other embodiments. In some embodiments of the current disclosure, the attachment aperture 506 and/or the drum key aperture 512 can be defined by elements other than the attachment portion 504 and drum key portion 510, respectively, such as the main body 502.

It is understood that elements of the nut devices 200,500 can be combined with one another so as to form a nut device having the butterfly attachment characteristics of the nut device 200 and the drum key functionality of the nut device 500. For instance, FIG. 6 shows a nut device 600 including a frame 602 including a butterfly piece 606 similar to or the same as the butterfly piece 206. Other components similar to or the same as the nut device 200, such as the axle 304 and spring 308, can also be included and arranged in a manner similar to or the same as the manner described above with regard to the nut device 200. The nut device 600 also includes a drum key portion 610 and drum key aperture 612 that can be similar to or the same as the drum key portion 510 and drum key aperture 512, and an attachment portion 604 that can be similar to or the same as the attachment portion 204 and/or the attachment portion 504, though it is understood that the drum key portion 610 and/or attachment portion 604 can be omitted in some embodiments. For example, the nut device 700 with the butterfly piece 706 shown in FIG. 7 does not include a drum key portion or attachment portion, and similarly, embodiments including only one of those portions are also possible. The nut devices 600,700 can have some or all of the functionalities described above both with regard to the nut device 200 and the nut device 500. For instance, an aperture within the frame of the nut device 700 can be shaped as a drum key aperture. Many different embodiments and combinations are possible as would be understood by one of skill in the art.

Although the present disclosure and its advantages have been described in detail, it should be understood that various changes, substitutions and alterations can be made herein without departing from the technology of the disclosure as defined by the appended claims. For example, relational terms, such as "above" and "below" are used with respect to a device. Of course, if the device is inverted, above becomes below, and vice versa. Additionally, if oriented sideways, above and below may refer to sides of a device. Moreover, the scope of the present application is not intended to be limited to the particular configurations of the process, machine, manufacture, composition of matter, means, methods and steps described in the specification. As one of ordinary skill will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

The description of the disclosure is provided to enable any person of reasonable skill to make or use the disclosure. Various modifications to the disclosure will be readily apparent to those of reasonable skilled, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein. Accordingly, the disclosure is not to be limited by the examples presented herein, but is envisioned as encompassing the scope described in the appended claims and the full range of equivalents of the appended claims.

We claim:

1. A nut device for use with a percussion stand, comprising:
   a frame;
   a butterfly piece attached to said frame, said butterfly piece comprising first and second butterfly portions;
   a compression spring biasing said butterfly piece to a closed position such that said first and second butterfly portions combine to form a butterfly axial hole, said compression spring held between said first and second butterfly portions.

2. The nut device of claim 1, wherein said butterfly axial hole is threaded.

3. The nut device of claim 2, wherein said frame is shaped to define a frame axial hole without threads, said frame axial hole aligned with said butterfly axial hole.

4. The nut device of claim 1, wherein said frame is shaped to define a frame axial hole aligned with said butterfly axial hole.

5. The nut device of claim 1, wherein said first butterfly portion is shaped to define a first spring aperture and said second butterfly portion is shaped to define a second spring aperture, a first portion of said compression spring within said first spring aperture and a second portion of said compression spring within said second spring aperture such that said compression spring is held between said first and second butterfly portions.

6. The nut device of claim 1, wherein said first butterfly portion comprises a first axial holding portion on an inside thereof and said second butterfly portion comprises a second axial holding portion on an inside thereof, and further comprising an axle through said first and second axial holding portions.

7. The nut device of claim 6, wherein said first butterfly portion comprises a first butterfly actuation portion on a first side of said axle, and wherein said second butterfly portion comprises a second butterfly actuation portion on said first side of said axle, said compression spring between said first butterfly actuation portion and said second butterfly actuation portion; and
   wherein squeezing said first butterfly actuation portion and said second butterfly actuation portion together causes a gap in said butterfly axial hole to enlarge or be formed.

8. The nut device of claim 7, wherein shortening the distance between said first butterfly actuation portion and said second butterfly actuation portion causes a gap in said axial hole to enlarge or be formed.

9. The nut device of claim 6, wherein said first butterfly portion comprises a first butterfly actuation portion on a first side of said axle, and wherein said second butterfly portion comprises a second butterfly actuation portion on said first side of said axle, said compression spring between said first butterfly actuation portion and said second butterfly actuation portion; and
   wherein shortening the distance between said first butterfly actuation portion and said second butterfly actuation portion causes a gap in said axial hole to enlarge or be formed.

10. The nut device of claim 6, wherein said axle is attached to said frame.

11. The nut device of claim 10, wherein said axle connects said frame to said butterfly piece.

12. The nut device of claim 1, further comprising a drum key portion extending from said frame, said drum key portion shaped to define a drum key aperture.

13. The nut device of claim 12, wherein said drum key aperture has a noncircular cross-section.

14. The nut device of claim 12, wherein said drum key aperture has a substantially square cross-section.

15. The nut device of claim 12, further comprising an attachment portion defining an attachment aperture, said attachment portion integral with and extending from said frame.

16. The nut device of claim 15, wherein said drum key portion and said attachment portion extend from opposite sides of said frame.

17. The nut device of claim 15, wherein said attachment portion extends from a bottom of said frame and said drum key portion extends from a top of said frame.

18. A nut device for use with a percussion stand, comprising:
   a frame;

a butterfly piece attached to said frame, said butterfly piece comprising first and second butterfly portions; and a spring biasing said butterfly piece to a closed position such that said first and second butterfly portions combine to form a butterfly axial hole;

wherein said first butterfly portion comprises a first axial holding portion on an inside thereof and said second butterfly portion comprises a second axial holding portion on an inside thereof, and further comprising an axle through said first and second axial holding portions;

wherein said first butterfly portion comprises a first butterfly actuation portion on a first side of said axle, and wherein said second butterfly portion comprises a second butterfly actuation portion on said first side of said axle, said spring between said first butterfly actuation portion and said second butterfly actuation portion; and wherein squeezing said first butterfly actuation portion and said second butterfly actuation portion together causes a gap in said butterfly axial hole to enlarge or be formed.

19. A nut device for use with a percussion stand, comprising:

a frame;

a butterfly piece attached to said frame, said butterfly piece comprising first and second butterfly portions; and a spring biasing said butterfly piece to a closed position such that said first and second butterfly portions combine to form a butterfly axial hole;

wherein said first butterfly portion comprises a first axial holding portion on an inside thereof and said second butterfly portion comprises a second axial holding portion on an inside thereof, and further comprising an axle through said first and second axial holding portions;

wherein said first butterfly portion comprises a first butterfly actuation portion on a first side of said axle, and wherein said second butterfly portion comprises a second butterfly actuation portion on said first side of said axle, said spring between said first butterfly actuation portion and said second butterfly actuation portion; and wherein shortening the distance between said first butterfly actuation portion and said second butterfly actuation portion causes a gap in said axial hole to enlarge or be formed.

\* \* \* \* \*